Patented Dec. 29, 1953

2,664,417

UNITED STATES PATENT OFFICE 2,664,417

N-SUBSTITUTED STREPTOMYCYLAMINES

Walter A. Winsten, Forest Hills, N. Y., assignor to Food Research Laboratories, Inc., Long Island City, N. Y., a corporation of New York No Drawing. Application August 9, 1948,
Serial No. 43,349

6 Claims. (Cl. 260—210)

This invention relates to novel derivatives of streptomycin which are (a) active as anti-biotics; (b) readily converted into anti-biotics; and (c) methods of preparing such derivatives.

The antibiotic streptomycin, originally discovered by Waksman and co-workers, is produced by certain strains of the organism Streptomyces griseus when it is grown on a suitable medium. Streptomycin has been shown to be particularly effective in inhibiting the growth of various gram-negative organisms as well as a variety of gram-positive organisms. It is also effective in the treatment of certain forms of tuberculosis.

Streptomycin, however, possesses certain deficiencies. Frequently the pathogenic bacteria, normally sensitive to streptomycin, become resistant to the antibiotic, making its further use of little value in the treatment of the disease. One of the reasons why the bacteria often become resistant in vivo is the fact that the antibiotic does not reach all the sites of the infection in the animal organism in adequate amounts. As a consequence, the bacteria present in such sites are thus frequently exposed to sub-lethal doses of streptomycin and so rapidly become acclimated to the drug.

The above deficiencies of streptomycin, namely, its failure to reach certain sites of infection in sufficient concentration, is related to the molecular structure of the antibiotic. Streptomycin is a molecule carrying two positive charges when in solution and possessing the hydrophylic groups common to sugar derivatives.

Streptomycin is composed of the diguanidine base streptidine, linked glucosidically to a disaccharide called streptobiosamine. Streptobiosamine is itself composed of two sugar residues linked glucosidically—namely, streptose and N-methyl-L-glucosamine. The entire streptomycin molecule may be pictured as follows according to Kuehl et al. J. Amer. Soc. 69, 1234, 1947.

From the foregoing molecular structure of streptomycin it is evident that the antibiotic possesses a free aldehydic carbonyl group which is a part of the streptose portion of the molecule.

It is well known that various carbonyl reagents such as phenylhydrazine, hydroxylamine and semicarbazide react with the aldehyde group of the antibiotic and in so doing produce derivatives which are inactive as antibiotics.

It should be noted that the only derivative of streptomycin which has thus far been reported in the literature as possessing antibiotic activity is dihydrostreptomycin. If the formula of streptomycin to be represented as S—CHO where S refers to the entire molecular structure save the alhehydic group, then the formation of dihydrostreptomycin may be represented as:

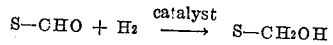

For convenience I shall hereafter refer to the group S—CH₂ as the streptomycyl radical.

From the chemistry of streptomycin it is evident that the drug is a positively charged, highly hydrophylic substance. The positive charges are due to the guanidine groups which bind hydrogen ions. Streptomycin is, as a consequence, usually prepared as a salt, as for example the trihydrochloride, the methylamine group of streptomycin binding the third molecule of the acid. Streptomycin can also be prepared as the trihydrochloride, calcium chloride double salt. As a consequence of the highly polar groups it contains, streptomycin has little or no solubility in organic solvents which are immiscible, or partly miscible, with water.

I have discovered a general method for making derivatives of streptomycin which contain various fat solubilizing groups. The derivatives are active as antibiotics and are more soluble in organic solvents than streptomycin. I have found that it is possible to cause the aldehyde group of strep-

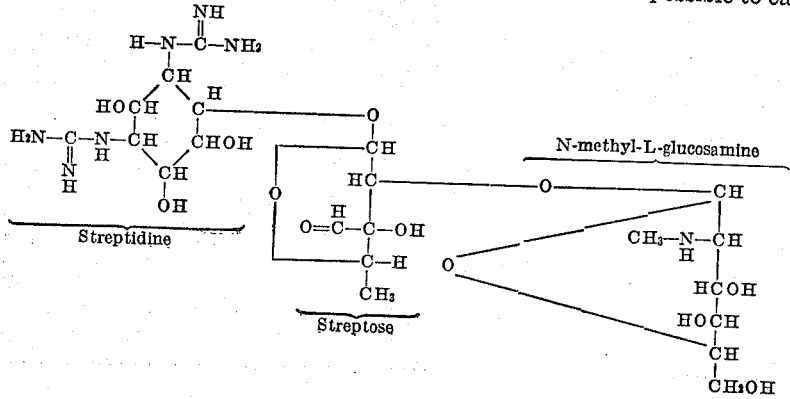

tomycin to react with various primary amines. By reduction of the resultant aldimines using appropriate hydrogenation catalysts and hydrogen, it is possible to prepare new derivatives of streptomycin which are active as antibiotics and possess solubility in organic solvents different from the parent streptomycin. The general reaction involved in producing these new antibiotic derivatives may be represented as follows:

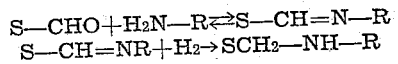

wherein R represents the fat-solubilizing radical which may be aryl, aliphatic hydrocarbon, aryl-aliphatic, aliphatic-aryl, aliphatic-heterocyclic, alicyclic, or heterocyclic.

While I have not as yet degraded the final antibiotic derivatives produced as above by classical procedures to prove the structure of the compounds, it is highly probable, by reason of the method of synthesis used, that these novel derivatives are represented by the general structural formula

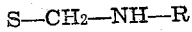

These compounds may therefore be regarded as derivatives of S—CH₂—NH₂. I designate the compound S—CH₂—NH₂ as streptomycylamine. The derivatives of streptomycin which I have prepared I therefore believe to be N-substituted streptomycylamines.

I have also found that although the aldimines prepared from streptomycin do not possess antibiotic activity, due perhaps to the presence of the double bond between the carbon atom of the aldehydic group and the nitrogen, compounds in which a double bond is present on the other side of the nitrogen atom, that is, compounds possessing the structure S—CH₂—N=R wherein S possesses the significance hereinbefore assigned to it and R has the same significance as hereinbefore assigned to R, possess antibiotic activity.

Accordingly, it is among the objects of this invention to introduce fat-solubilizing groups into the streptomycin molecule and thereby obtain derivatives possessing fat-soluble characteristics as well as antibiotic activity.

A further object of the invention is the production of derivatives of streptomycin which probably involve reactions with the carbonyl group of the streptomycin molecule, such derivatives being active antibiotics.

Another object of the invention is the production of derivatives of streptomycin which are active as antibiotics and possess greater solubility in organic solvents than the parent antibiotic.

A further object of the invention is the production of compounds which are probably N-substituted streptomycylamines that are characterized by greater solubility in organic solvents than the parent antibiotic streptomycin.

Another object of the invention is the production of compounds which are probably N-substituted streptomycylamines that are characterized by greater solubility in organic solvents than the parent antibiotic streptomycin, and which possess antibiotic activity.

A further object of this invention is the production of compounds which are probably aldimines of streptomycin and primary amines.

Another object of the invention is the provision of compounds which are probably aldimines of streptomycin and primary amines characterized by the fact that they readily hydrolyze with the formation of streptomycin.

A further object of the invention is the provision of compounds which are probably aldimines of streptomycylamine and an aldehyde.

Another object of this invention is the provision of a method whereby streptomycin may be converted into an aldimine by interaction with a primary amine.

A further object of this invention is the provision of a method whereby an aldimine of streptomycin and a primary amine may be converted by hydrogenation into an N-substituted streptomycylamine.

Another object of this invention is a method for preparing an aldimine by the interaction of streptomycylamine and an aldehyde.

A further object of this invention is the provision of a method whereby an aldimine of streptomycylamine and an aldehyde may be converted by hydrogenation into an N-substituted streptomycylamine.

In the equation given above for the formation of the aldimines, the reaction is represented as being reversible in view of the known fact that such aldimine compounds and azomethine compounds in general are hydrolized in the presence of water to varying degrees, depending upon the particular compounds being studied. By the use of excess amine and anhydrous media it is possible to favor aldimine formation prior to reduction with the hydrogenation catalyst and hydrogen.

Before proceeding to set forth examples illustrating how my invention may be accomplished, I shall describe in some detail the method of analysis I have used to demonstrate that I have made new derivatives of streptomycin which are active as antibiotics. This method of analysis, coupled with the method of synthesis described, serves to define and characterize the new streptomycin derivatives that I have discovered.

The method of analysis employed is one which proves the presence of a new antibiotic entity in a reaction product obtained by the general procedure described above where such a reaction product also contains some unchanged streptomycin and even some dihydrostreptomycin.

The presence of the unchanged streptomycin and the dihydrostreptomycin may be a consequence of the reversibility of the aldimine formation referred to previously. I found it necessary to be able to show in a convincing fashion that the antibiotic activity of my resultant products was due in part at least to the new derivatives that I had made and not merely to unchanged streptomycin or dihydrostreptomycin.

The method of analysis which I have employed for proving that new derivatives of streptomycin had been synthesized, involves the use of the method described by Winsten and Eigen (Abstracts, page 26C, 113th meeting of American Chemical Society, April 19, 1948). The method of analysis makes use of paper chromatography. In the above mentioned article Winsten and Eigen have demonstrated the special value of this technique in discovering the presence of hitherto unknown members of the streptomycin complex. Prior to the development of the paper chromatographic method as applied to the streptomycin problem by Winsten and Eigen, it was known that crude streptomycin preparations contained, in addition to streptomycin itself, another antibiotic called streptomycin B. The latter antibiotic was subsequently shown by Fried et al. (J. Amer. Chem. Soc. 69, 1549 (1947)) to be streptomycin linked glucosidically to the sugar d-mannose and hence now called mannosidostreptomycin. Like streptomycin it also contains a free carbonyl group of the aldehyde type. By use of the paper chromatographic method, Winsten and Eigen demonstrated that in addition to streptomycin and mannosidostreptomycin, certain crude streptomycin preparations contained at least three other antibiotic entities.

In carrying out the method of analysis, a preparation containing a derivative of streptomycin prepared in accordance with my invention is subjected to paper chromatographic analysis in order to separate the derivative from any unchanged streptomycin or dihydrostreptomycin also present in the reaction product. As will be apparent, this method of analysis not only serves to separate a derivative from any contaminating streptomycin and dihydrostreptomycin, but at the same time proves that the derivatives possess greater solubility in an organic solvent than does the parent antibiotic. At the same time this method of analysis allows for proving the antibiotic activity of the derivative. Moreover, such method provides means for quantitatively establishing that the derivative possesses a greater solubility in an organic solvent than does the parent streptomycin.

In order therefore to prove the formation of a new derivative of streptomycin and at the same time to establish its greater solubility in organic solvents, a reaction product resulting from the reduction of the particular aldimine being studied is subjected to paper chromatographic analysis.

A 10 microliter sample of a solution of a reaction product containing from 300 up to 12,000 units of antibiotic activity, where one unit is equal to that of one microgram of streptomycin base, is placed near the head of a paper strip chromatogram. Whatman No. 1 paper cut in strips 1.5″ by 16″ is used. The chromatogram is then developed for from one to two days at room temperature, using a suitable organic solvent. Winsten and Eigen, supra, recommend wet n-butanol to which has been added 2% of piperidine by volume and 2 grams of p-toluenesulfonic acid monohydrate per 100 ml. Therefore this organic solvent is used. The apparatus used to develop the chromatogram and the general technique has been described by Consden et al. (Biochem. J. 38, 224 (1944)) and by Winsten (Science 107,605, (1948)). After development of a chromatogram the solvent is then removed from the strip either by washing three times with ether, or, in the case of a derivative which is washed off the strip by ether, by drying at about 35° C. for several hours. In this latter case some piperidine salt of p-toluenesulfonic acid is left on the strip. This does not interfere with subsequent operations. After drying, the paper strip chromatogram with the various antibiotic members of a reaction mixture, now occupying definite positions along the strip, is laid on an agar plate seeded with *Staphylococcus aureus* 209P or American Type Culture Collection No. 9996 (gram positive organisms) or a strain of *Escherichia coli* (New York City Board of Health No. 9) (a gram negative organism). The streptomycin assay agar may be obtained from the Difco Laboratories.

After allowing the paper strip chromatogram to soak for 5 minutes on the surface of the moist agar, the strip is removed. In this operation the moist agar leaches the antibiotic from the strip chromatogram. The agar plate is then incubated for 5 to 24 hours at 37° C. After incubation, zones of inhibition of bacterial growth are seen along the locus of the strip chromatogram. These zones mark the positions on the chromatogram of the particular substances causing the inhibition of bacterial growth.

In order to characterize an antibiotic present in such a chromatogram, one may define an $R_F$ value (see Consden et al. loc. cit.) as follows:

$$R_F = \frac{\text{Distance antibiotic has moved from site of application of test sample on chromatogram}}{\text{Distance solvent front has moved from site of application of test sample}}$$

The $R_F$ value is a function of the solvent used and of the temperature. The maximum value of $R_F$ is 1.0. A substance with an $R_F$ of 0.25, for example, is less soluble in the organic solvent used to develop a chromatogram and moves more slowly than a substance with an $R_F$ of 0.5, for example. As a rule, if the $R_F$ values of two substances differ by more than 20% they can be readily separated from one another on a chromatogram. It is not wise to characterize a given derivative by its $R_F$ value alone since this varies with temperature. It is best to obtain the $R_F$ for a known antibiotic at the same time and to refer the $R_F$ of a new derivative to such a figure. I have used the parent antibiotic streptomycin as the reference antibiotic. Thus, in determining the $R_F$ value of a derivative, that of streptomycin may be determined simultaneously, by adding streptomycin to the specimen which is to be analyzed by paper chromatography. Alternatively, where unchanged streptomycin is present in the reaction product, such streptomycin may, and can be, used as the reference antibiotic.

Using wet (water saturated) n-butanol-2% piperidine-2% p-toluenesulfonic acid monohydrate as the solvent (hereinafter called solvent BPP) and Whatman No. 1 paper, the $R_F$ value of streptomycin was found to be 0.25 (room temperature about 23° C.) That is, the center of the streptomycin zone moved one centimeter down the chromatogram for every four centimeters that the solvent advanced. In warm weather, the $R_F$ value for streptomycin rose as high as 0.35. In such a case the $R_F$ value of any new antibiotic derivative was multiplied by the ratio 0.25/0.35. In this way the $R_F$ values of all new derivatives have been referred to that of streptomycin taken as 0.25. Under the same conditions, dihydrostreptomycin had an $R_F$ value of 0.15. That is, it moves more slowly on a chromatogram because it is less soluble in solvent BPP.

It will be evident that the method of analysis described coupled with the method of synthesis proves the formation of new streptomycin derivatives, of modified and, as will be seen, greater solubility in organic solvents than the parent antibiotic. The method of analysis also proves the derivatives to be antibiotics since the positions of the new antibiotics on a strip chromatogram are revealed by the zones of inhibition of bacterial growth surrounding their locus on the agar plate culture.

In the following examples the simplest derivative of streptomycin which I have found to move significantly faster than streptomycin on a chromatogram, and hence to be more soluble than streptomycin in solvent BPP, is the derivative obtained by reacting n-propylamine with streptomycin and subjecting such reaction product to reduction with hydrogen using a hydrogenating catalyst. This derivative is probably N-propylstreptomycylamine.

EXAMPLE 1

150 mg. of the purest streptomycin available commercially (probably at least 90% streptomycin) in the form of trihydrochloride, calcium chloride double salt and containing 1 gm. of streptomycin base per 1.3 gram of the salt of the antibiotic, was dissolved by warming in 1 ml. of anhydrous methanol. 0.25 ml. of n-propylamine was added to the solution of the antibiotic and the mixture was allowed to stand at room temperature overnight. At this time it was diluted to 10 ml. with more anhydrous methanol. 50 mg. of Adam's platinum oxide were prereduced with hydrogen, while suspended in methanol. The resulting platinum was used to catalyze the reduction of the reaction mixture of streptomycin and propylamine. The reduction was carried out at room temperature under a pressure of one atmosphere of hydrogen. The time of reduction was at least 5 hours. The product of the reaction was then subjected to paper chromatographic analysis. In addition to some unchanged streptomycin and some dihydrostreptomycin, the reaction mixture was shown to contain a new antibiotic which, from the method of synthesis, is probably N-n-propylstreptomycylamine. This antibiotic had an $R_F$ value of 0.46 when the $R_F$ of streptomycin itself was 0.25. The new antibiotic inhibited the growth of S. aureus and E. coli (for the strain numbers see above). This new antibiotic is thus demonstrated as being more soluble in solvent BPP than streptomycin.

It is to be noted that on some occasions a second new antibiotic was present in reaction mixtures prepared as above. Its structure is not known. Also, it caused only a small trace zone of inhibition. Its $R_F$ value was 0.70.

EXAMPLE 2

N-n-butylstreptomycylamine 150 mg. of a streptomycin preparation similar to that used in Example 1 was dissolved in 0.5 ml. of anhydrous methanol. 0.03 ml. of n-butylamine was added and the solution was allowed to stand overnight at room temperature. The solution was then diluted to 10 ml. with dry methanol and was subjected to reduction with prereduced platinum oxide as described for Example 1. Analysis of the resultant reaction product by paper chromatograpic analysis using solvent BPP, demonstrated the presence of a new antibiotic which is probably N-n-butylstreptomycylamine. The new antibiotic had an $R_F$ value of 0.62 when that for streptomycin itself was 0.25, thus showing the greater solubility of the new antibiotic in the solvent used to develop the chromatogram. The antibiotic so prepared is active against the E. coli and S. aureus strains used in Example 1.

EXAMPLE 3

N-n-octylstreptomycylamine 150 mg. of a streptomycin preparation similar to that used in Example 1 was dissolved in 0.5 ml. of anhydrous methanol. 0.06 ml. of n-octylamine was added and the solution was allowed to stand overnight at room temperature. The solution was then diluted to 10 ml. with dry methanol and was subjected to reduction with hydrogen as described for Example 1. Analysis of the resultant reaction product by paper chromatographic analysis using solvent BPP, demonstrated the presence of a new antibiotic which is probably N-n-octylstreptomycylamine. The new antibiotic had an $R_F$ value of 0.75 when that for streptomycin itself was 0.25, thus showing the greater solubility of the derivative in an organic solvent. The new antibiotic so prepared is active against E. coli and S. aureus strains used in Example 1.

EXAMPLE 4

N-n-decylstreptomycylamine 150 mg. of a streptomycin prepartion similar to that used in Example 1 was dissolved in 1 ml. of anhydrous methanol. 0.1 ml. of n-decylamine was added and the solution was allowed to stand overnight at room temperature. The solution was then diluted to 10 ml. with dry methanol and was subjected to reduction with hydrogen as described for Example 1. Analysis of the resultant reaction product using the paper chromatographic method with the solvent BPP, demonstrated the presence of a new antibiotic which is probably N-n-decylstreptomycylamine. The new antibiotic had an $R_F$ of 0.72 when that for streptomycin was 0.25, thus demonstrating the greater solubility of the new derivative in the solvent used. The antibiotic so prepared was active against the strains, the same as in Example 1, of E. coli and S. aureus used. In the course of experiments on this new antibiotic it was also shown that n-decylamine itself is also active as an antibiotic against the organisms tested. However it moves more rapidly than the new streptomycin derivative, its $R_F$ being 0.82. It may be removed from the new antibiotic derivative by precipitation with ether which holds the n-decylamine in solution.

EXAMPLE 5

N-n-octadecylstreptomycylamine 150 mg. of streptomycin similar to that used in Example 1 was dissolved in 1 ml. of dry methanol. A solution of 250 mg. of n-octadecylamine in 2 ml. of methanol was added and the solution was allowed to stand overnight at room temperature. The solution was then diluted to 10 ml. with methanol and subjected to reduction using patinum oxide as previously described for Example 1. Paper chromatographic analysis with solvent BPP, of the resultant reaction product, revealed the presence of a new antibiotic which is probably N - n - octadecylstreptomycylamine. The $R_F$ value of the new antibiotic was 0.87 when that for streptomycin was 0.25. The new antibiotic was active against the strains, the same as used in Example 1, of S. aureus and E. coli tested. The amine octadecylamine was not active in preventing growth of bacteria due to its great insolubility in water.

The new antibiotic is washed off the strip chromatogram if ether is used to dry such a strip as described earlier. Accordingly the strip should be air dried after chromatography.

EXAMPLE 6

N-cyclohexylstreptomycylamine 150 mg. of streptomycin similar to that used in Example 7 was dissolved in 1 ml. of dry methanol. 0.1 ml. of cyclohexylamine was added and the solution was allowed to stand overnight at room temperature. The solution was then diluted to 5 ml. with dry methanol and subjected to reduction with hydrogen using platinum oxide as previously described for Example 1. Paper chromatographic analysis with solvent BPP of the resultant reaction product revealed the presence of a new antibiotic which is probably N-cyclohexylstreptomycylamine. The new antibiotic had an $R_F$ of 0.62 when that for streptomycin was 0.25. The new antibiotic was active against the strains, the same as in Example 1, of *S. aureus* and *E. coli* used. It is of interest that the zone of inhibition produced by the new antibiotic is normal in the sense that it is sharp and clear and devoid of any bacterial growth for *S. aureus*. However, that for *E. coli* was turbid indicating a low grade growth of the bacteria suggesting that this organism might, at least partially, acclimate itself to the new antibiotic. This finding suggests that the derivative here discussed will not be the antibiotic of choice against gram-negative bacteria.

EXAMPLE 7

N-phenylstreptomycylamine 150 mg. of streptomycin similar to that used in Example 1 was dissolved in 0.7 ml. of dry methanol. 0.2 ml. of aniline was added and the solution was allowed to stand overnight at room temperature. The solution was then diluted to 10 ml. and was then subjected to reduction using platinum oxide and hydrogen as described for Example 1. Paper chromatographic analysis of the resultant reaction product with solvent BPP, revealed the presence of a new antibiotic which is probably N-phenylstreptomycylamine. The new antibiotic had an $R_F$ value of 0.61 when that for streptomycin was 0.25. The new antibiotic, contrary to the experience with that of Example 6 above, was as active or perhaps somewhat more active against *E. coli* as against *S. aureus*, the same strains as used in Example 1, from the size of the zone of inhibition. Also the zone was sharp and clear and free of bacterial growth.

Another zone of inhibition was seen ($R_F=0.39$) due to some other antibiotic of unknown composition. It may be due to the unreduced aldimine, since it was sometimes found in an aniline-streptomycin reaction product before the hydrogenation of such product.

EXAMPLE 8

N-DL-α-phenylethylstreptomycylamine 150 mg. of streptomycin similar to that used in Example 1 was dissolved in 1 ml. of dry methanol. 0.3 ml. of DL-α-phenylethylamine was added and the solution was allowed to stand overnight at room temperature. The solution was then diluted with dry methanol to 10 ml. and was subjected to reduction with platinum oxide and hydrogen as described for Example 1. Paper chromatographic analysis of the reaction product with solvent BPP revealed the presence of a new antibiotic which is probably N-DL-α-phenylethylstreptomycylamine. The new antibiotic had an $R_F$ value of 0.57 as compared to that of streptomycin which was 0.25. It was active against both the *S. aureus* and *E. coli* strains used in Example 1.

EXAMPLE 9

N-furfurylstreptomycylamine 150 mg. of streptomycin similar to that used in Example 1 was dissolved in 1 ml. of dry methanol. 0.2 ml. of furfurylamine was added and the solution was allowed to stand at room temperature overnight. The solution was diluted to 5 ml. with dry methanol and was then subjected to reduction with platinum oxide and hydrogen as described for Example 1. Paper chromatographic analysis of the reaction product with solvent BPP revealed the presence of two new antibiotics. One is probably N-furfurylstreptomycylamine. The other is probably a reduction product of this in which the furfuryl ring has been further reduced. One antibiotic had an $R_F$ value of 0.48, and the other had an $R_F$ of 0.08 when that of streptomycin was 0.25. It is believed that the faster moving antibiotic is N-furfurylstreptomycylamine. Both new antibiotics were active against the *S. aureus* and *E. coli* strains used in Example 1.

In addition to the above examples, I have reacted streptomycin with the following amines: 2-thiazolylamine, 2-aminopyridine, 2-aminopyrimidine, 2-aminomethylpyrimidine. The resulting aldimines were subjected to reduction as described earlier yielding a mixture of antibiotics containing in all probability the corresponding N-streptomycylamine derivatives. However, this has not been demonstrated unequivocally by paper chromatography for the following reasons: In the case, for example, when 2-aminopyridine is allowed to react with streptomycin an aldimine is probably formed which has the formula

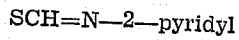

$$SCH=N-2-\text{pyridyl}$$

When a sample of a solution containing this compound was chromatographed prior to reduction with a catalyst and hydrogen, there was observed a zone of inhibition ahead of that of streptomycin itself which covered a long area along the locus of a strip chromatogram. This suggests that the aldimine in question moves faster than streptomycin on a chromatogram. It also suggests that, during exposure to the solvent and water vapor during chromatography the aldimine was sufficiently stable to hydrolysis, as otherwise it could not exist long enough to move in advance of streptomycin.

This aldimine which moves faster than streptomycin is evidently active as an antibiotic itself or, once transferred to the moist agar, it hydrolyzes to some extent to regenerate streptomycin thus causing the zone of inhibition. Whichever is the correct explanation, a zone of inhibition is obtained due to a product which moves faster than streptomycin and this exists without the necessity of reduction with hydrogen.

When the reaction mixture of streptomycin and 2-amino pyridine was subjected to reduction to produce the corresponding streptomycylamine derivative, paper chromatography showed the presence of a product which moved faster than streptomycin. This reduction product which is probably the N-2-pyridyl-streptomycylamine could not be readily distinguished from any unchanged aldimine present since both products have about the same $R_F$ value. Thus, if any of the aldimine remains after the reduction it is not easy to tell whether the zone of inhibition in front of streptomycin is due to a new streptomycylamine derivative or is due to the original aldimine. The above consideration applies to the above amines mentioned in the paragraph before the preceding one.

In contrast with the phenomena described in the foregoing paragraph, the aldimine resulting from the condensation of n-butylamine and streptomycin is sufficiently unstable so that it hydrolyzes to the original streptomycin and the amine fairly readily. Thus the developing organic solvent used in paper chromatography removes the n-butylamine formed (due to the hydrolytic action of the water in the solvent) at the site of application of a test sample on a paper strip. The streptomycin so regenerated moves at the same rate as the unchanged streptomycin originally in equilibrium with the aldimine in the methanol solution. As a consequence no new zone is seen in this case prior to reduction. After reduction of the aldimine with the formation of the N-streptomycylamine derivative which does not undergo hydrolysis, a new zone of inhibition is seen ahead of that of the streptomycin. The same results obtain for all the examples described above.

In addition to the above I have made the derivative, N-benzylstreptomycylamine ($R_F$ 0.58 when that of streptomycin is 0.25). This was made by starting with streptomycylamine itself, which in turn can be obtained by reduction of the oxime of streptomycin. Streptomycylamine was reacted with benzaldehyde to give an aldimine of the unstable kind (readily hydrolyzed) such as described above. Before reduction of this aldimine, paper chromatography thereof revealed no new zone of inhibition moving faster than the streptomycin. Only streptomycylamine ($R_F$ 0.07) and streptomycin and some dihydrostreptomycin were present. After reduction of the aldimine a new zone of inhibition was seen. Its zone against $S.$ $aureus$ was turbid, suggesting that the organism acclimates to this antibiotic. The derivative, N-benzylstreptomycylamine, was also made by reacting streptomycin with benzylamine to obtain the aldimine and then reducing this aldimine by hydrogenation. The N-benzylstreptomycylamine so made was found to have the same $R_F$ value as that obtained by the first method of synthesis described.

I have also prepared a derivative of streptomycin in which the aliphatic hydrocarbon radical was halogenated. Such product was obtained by reacting streptomycylamine with anhydrous chloral in methanol solution. The $R_F$ of such derivative was 0.64 when that of streptomycin was 0.25, using BPP as the solvent. When streptomycin itself was reacted with chloral as a control it produced no such derivative.

The derivative above described is a product having the following probable formula

$$S—CH_2N=CH—CCl_3$$

It will be observed that the position of the double bond in this compound is the same as that of the aldimine obtained by reacting streptomycylamine and benzaldehyde.

This halogenated derivative, however, is far more stable to hydrolysis than the analogous benzylidine derivative.

While I have used the calcium chloride trihydrochloride double salt of streptomycin in carrying out the syntheses described in the foregoing examples, it will be understood that other salts of streptomycin may be used as starting materials.

I have used the platinum oxide catalyst but it will be obvious that there may be used platinum-asbestos, palladium on asbestos, Raney nickel or any other appropriate hydrogenation catalyst, using pressures up to 1000 pounds p. s. i. and temperatures of about 60° C. It will also be understood that while I have given the $R_F$ values to identify the new antibiotics, such values are not absolute. They may vary in absolute magnitude with changes in the type of paper used in carrying out the chromatographic analysis by as much as 20%. An $R_F$ value is a relative value and as such serves to point out the greater solubility in a solvent of the derivatives over that of the parent streptomycin.

It will be understood that the foregoing description of my invention and of the method whereby it may be practiced is merely illustrative of the principle of my invention and accordingly that the appended claims are to be understood as defining my invention within the full spirit and scope thereof.

I claim:
1. As new compounds, derivatives of streptomycin having the formula $S—CH_2NHR'$ wherein S represents the entire molecular structure of streptomycin except the aldehydic radical thereof, and R' represents a radical selected from the group consisting of phenyl, benzyl and, aliphatic hydrocarbon having at least six carbon atoms.

2. As a new product, N-n-decylstreptomycylamine.

3. As a new product, N-n-octylstreptomycylamine.

4. As a new product, N-n-octadecylstreptomycylamine.

5. As a new product, N-phenylstreptomycylamine.

6. As a new product, N-benzylstreptomycylamine.

WALTER A. WINSTEN.

References Cited in the file of this patent
UNITED STATES PATENTS

| Number | Name | Date |
|---|---|---|
| 2,509,191 | Lott | May 23, 1950 |
| 2,607,770 | Winsten et al. | Aug. 19, 1952 |

OTHER REFERENCES

Denkelwater et al., Science, vol. 102 (1945), page 12.

Brink et al., Science, vol. 102 (1945), pages 506–507.

Geiger et al., Proc. Soc. Exptl. Biol Med., vol. 61 (1946), pages 187–192.

Fitzgerald et al., J. Biol. Chem., vol. 172 (1948), pages 845–846.

Donovick et al., J. Biol. Chem. 164 (1946), pages 173–181.